US008424673B2

(12) United States Patent
Ravat et al.

(10) Patent No.: US 8,424,673 B2
(45) Date of Patent: Apr. 23, 2013

(54) BELT FOR TRANSFERRING PLIES CONTAINING METAL REINFORCEMENTS

(75) Inventors: Stephane Ravat, Saint Genes Champanelle (FR); Clement Dubois, Clermont-Ferrand (FR); Patrick Marchal, Clermont-Ferrand (FR)

(73) Assignees: Compagnie Generale des Establissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 46 days.

(21) Appl. No.: 13/126,420

(22) PCT Filed: Oct. 13, 2009

(86) PCT No.: PCT/EP2009/063320
§ 371 (c)(1),
(2), (4) Date: Sep. 19, 2011

(87) PCT Pub. No.: WO2010/049266
PCT Pub. Date: May 6, 2010

(65) Prior Publication Data
US 2011/0315516 A1 Dec. 29, 2011

(30) Foreign Application Priority Data

Oct. 27, 2008 (FR) ...................................... 08 57280

(51) Int. Cl.
*B65G 17/46* (2006.01)
(52) U.S. Cl.
USPC .......................... 198/679; 198/626.1; 198/606

(58) Field of Classification Search .................. 198/604, 198/605, 606, 626.1, 679, 846, 847
See application file for complete search history.

(56) References Cited

U.S. PATENT DOCUMENTS 2,527,911 A * 10/1950 Buccicone ..................... 198/606
2,600,475 A * 6/1952 Buccicone ..................... 198/679
(Continued)

FOREIGN PATENT DOCUMENTS

| EP | 0 343 426 | 11/1989 |
| EP | 0 537 348 | 12/1992 |
| EP | 1 074 494 | 2/2001 |
| JP | 59 187836 | 10/1984 |

(Continued)

*Primary Examiner* — James R Bidwell
(74) *Attorney, Agent, or Firm* — Cozen O'Connor

(57) ABSTRACT

Device for transferring a reinforcing ply having the overall shape of a parallelogram and containing reinforcing threads with ferromagnetic properties and making a given angle b, smaller than 90°, with the longitudinal direction of the said reinforcing ply, comprising at least two transfer belts which overlap over a given length 1 and are separated by a given and small-sized distance, each of the belts comprising a magnetized region of trapezoidal shape, the bases of which are parallel to the longitudinal direction of the belts and are intended to hold the reinforcing ply firmly against the moving surface of the said transfer belts, characterized in that, in the region of overlap of the belts, the side of the trapezium connecting the two bases of the magnetized region of the first belt forms an angle $a_1$ with the longitudinal direction which is smaller than the angle of the threads b, and the side of the trapezium connecting the two bases of the magnetized region of the second belt forms an angle $a_2$ with the longitudinal direction which is larger than the angle of the threads b, and in that the magnetized regions of the two belts do not overlap, so as to form a non-magnetized region positioned in line with the region of overlap of the transfer belts.

8 Claims, 2 Drawing Sheets

U.S. PATENT DOCUMENTS

| | | | | |
|---|---|---|---|---|
| 3,150,764 | A | * | 9/1964 | Buccicone .................... 198/679 |
| 4,411,724 | A | | 10/1983 | Ito et al. |
| 4,769,104 | A | | 9/1988 | Okuyama et al. |
| 7,281,710 | B2 | * | 10/2007 | Okazaki et al. ............... 198/679 |

FOREIGN PATENT DOCUMENTS

| JP | 62 011634 | 1/1987 |
|---|---|---|
| JP | 2007 186340 | 7/2007 |

* cited by examiner

BELT FOR TRANSFERRING PLIES CONTAINING METAL REINFORCEMENTS

RELATED APPLICATIONS

This is a U.S. national stage of application No. PCT/EP2009/063320, filed on Oct. 13, 2009.

This patent application claims the priority of French patent application no. 08/57280 filed Oct. 27, 2008, the disclosure content of which is hereby incorporated by reference.

FIELD OF THE INVENTION

The field of the invention relates to the manufacture of reinforcing plies intended to be used in the construction of tires intended to be fitted to transport vehicles. More specifically, the invention addresses the problem of transferring a length of reinforcing ply between two transfer belts.

BACKGROUND OF THE INVENTION

The manufacture of reinforcing plies intended for the construction of tires is widely known in the prior art and involves taking, from a continuous ply known as a straight ply, at a given cutting angle b, lengths of ply of a given physical width and hereinafter known as widths. The straight ply is made up of threads coated in a rubber compound, which are mutually parallel and oriented in the longitudinal direction of the ply. The widths are placed end to end to constitute a continuous reinforcing strip. The reinforcing threads make an angle b with the longitudinal direction of the reinforcing strip. This angle b is non-zero and smaller than 90°. The value of the angle b is generally comprised between 15° and 70°.

A second step of the tire-building process involves taking lengths of reinforcing ply, or reinforcing ply from the reinforcing strip. The physical length of these lengths of reinforcing ply is tailored to suit the circumference for the laying of the said reinforcing ply on the reinforcing ply building means such as a crown form, which is generally cylindrical.

The lengths of reinforcing ply are cut between two reinforcing threads. Hence, prior to laying, the reinforcing ply is in the form of a parallelogram the front and rear selvedges of which make an angle b with the longitudinal direction of the reinforcing ply and the lateral selvedges of which are parallel to this same direction.

Particular attention is paid to maintaining the geometric characteristics of the reinforcing ply throughout the process, from the cutting-to-length step to final transfer onto the tire-building form. This is because it is necessary as far as possible to avoid any deformation that could alter the length of the reinforcing ply or change the angle of the threads, particularly where there is a desire to automate the entire process.

For this reason, it is known practice, when the reinforcing threads have magnetic properties, for the cut-to-length reinforcing plies to be transferred using magnetic belts capable of depriving the reinforcing ply of any unwanted movement while it is being transferred from the cutting station to the crown form.

It may also prove advantageous for the cut-to-length reinforcing ply to be transferred from a first transfer belt to a second transfer belt dedicated to the function of bringing the reinforcing ply up close to and laying it on the tire-building form.

The two belts then overlap over a certain length and are distant from one another by as small a distance as possible, but which distance is greater than the thickness of the reinforcing ply, so that the reinforcing ply can be transferred from the first belt to the second belt with the least possible unwanted movement of the said plies.

By way of example, publications U.S. Pat. No. 4,411,724 or, alternatively, U.S. Pat. No. 4,769,104, describe transfer belts of this type, in which the force of attraction of the electromagnetic means of the second belt is greater than the force of attraction of the magnetic means of the first belt, allowing a metal ply to be transferred from the first belt to the second belt. The magnetized regions of the first and of the second belts overlap.

However, in the case of reinforcing plies the geometry of which can be likened to that of a non-rectangular parallelogram, it is difficult to control the transfer of the rearmost tip of the reinforcing ply onto the second belt without altering the position of the forward tip of the next reinforcing ply which is intended to remain on the first belt. The problem here is that the consecutive plies downstream of the cutting tool are contiguous at the rear part of the front reinforcing ply or first reinforcing ply, and at the front part of the next reinforcing ply or second reinforcing ply.

Because the shape of transfer belts is generally that of a rectangle, it is difficult to maintain the magnetization under the forward tip of the second reinforcing ply while at the same time releasing this same magnetization under the rear tip of the first reinforcing ply so that the said rear tip of the first reinforcing ply can be transferred from the first belt to the second belt.

SUMMARY OF THE INVENTION

One object of the invention is to provide a transfer device capable of providing a solution to this problem.

One aspect of the present invention is directed to a device intended for transferring a reinforcing ply having the overall shape of a non-rectangular parallelogram and containing reinforcing threads with magnetic properties and making a given angle b with the longitudinal direction of the said reinforcing ply, comprises at least two transfer belts which overlap over a given length 1 and are separated by a given and small-sized distance e.

Each of the belts comprises a magnetized region of trapezoidal shape, the bases of which are parallel to the longitudinal direction of the belts and are intended to hold the reinforcing ply firmly against the moving surface of the said transfer belts.

This transfer device is characterized in that, in the region of overlap of the belts, the side of the trapezium connecting the two bases of the magnetized region of the second belt forms an angle $a_2$ with the longitudinal direction which is smaller than or equal to 90°, and the side of the trapezium connecting the two bases of the magnetized region of the first belt forms an angle $a_1$ with the longitudinal direction which is smaller than the angle $a_2$, and in that the magnetized regions of the two belts do not overlap, so as to form a non-magnetized region positioned in line with the region of overlap of the transfer belts.

Because the angle b of the threads is conventionally smaller than 90°, steps are therefore taken to ensure that the angle $a_1$ is smaller than the angle b of the threads, and that the angle $a_2$ is larger than or equal to the angle b of the threads.

In this way, when two consecutive reinforcing plies arrive in the region of overlap of the belts, the line of contact between the rear selvedge of the first reinforcing ply and the front selvedge of the second reinforcing ply lies in a non-magnetized region. The forward tip of the second reinforcing ply remains attracted by the first transfer belt over most of its surface area, and the rear tip of the first reinforcing ply is attracted by the magnetized region of the second transfer belt because of the small distance e separating the two belts in the region of overlap.

It is thus possible to transfer the first reinforcing ply from the first belt to the second belt without causing any unwanted movement of the front part of the second reinforcing ply, while at the same time minimizing the free movements of the rear part of the first reinforcing ply that could alter its geometry. The first reinforcing ply can therefore be brought to the tire-building region by the second transfer belt, independently of the second reinforcing ply.

It will be noted that when the angle b is equal to 90°, which is the general case of carcass reinforcing plies, the problem of maintaining the angle of the front and rear parts of the ply may resolve itself without there being any need to alter the transfer devices commonly used in industry, and in which the magnetized regions are of generally rectangular shape, which amounts to considering the angles $a_1$ and $a_2$ to be right angles.

BRIEF DESCRIPTION OF THE DRAWINGS

The description which follows relies on some preferred embodiments of the invention and on FIGS. 1 to 4 in which.

DETAILED DESCRIPTION OF THE DRAWINGS

Figure 1:
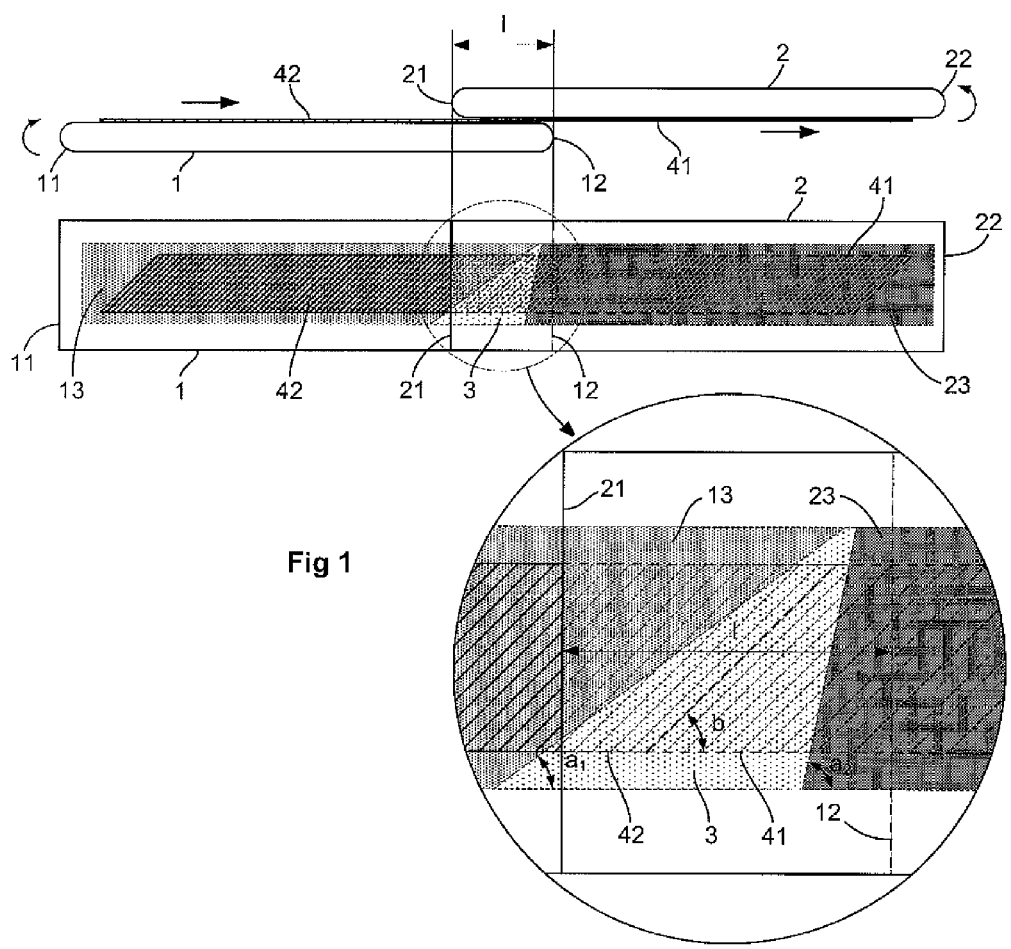
FIG. 1 depicts a schematic view in section and view from above of a device according to the invention, and of a view from above of a circled detail of the region of overlap.

The transfer device illustrated in FIG. 1 comprises a first transfer belt 1 and a second transfer belt 2. Each of these belts is formed of a continuous conveyor belt running between two drive rolls situated at the two ends of the transfer belt, 11, 12 and 21, 22 respectively. The conveyor belt runs at a regulated speed so as to carry along the reinforcing plies 41 and 42 respectively which are held on the surface of the said conveyor belt.

The reinforcing plies 41 and 42 are made up of metal threads coated in a rubber compound and making an angle b with the longitudinal direction. These metal threads are of the ferromagnetic type.

Each belt has a magnetized region 13, 23 respectively, able to keep the reinforcing plies held firmly against the surface of the conveyor belt. For this purpose, magnets are positioned under the surface of the belt near the underside of the conveyor belt and on the opposite side to the side of the conveyor belt that is in contact with the product being transferred. The magnets may be permanent magnets or, for preference, electromagnets, positioned in such a way as to produce a magnetic field over a defined region (13, 23) of the conveyor belt.

The two belts overlap over a given length 1 which means that the magnetized region 13 of the first belt 1 is positioned facing the magnetized region 23 of the second belt 2. The separation e between the two belts (see FIG. 2) is determined to allow the reinforcing plies to pass, on the one hand, and so that the reinforcing ply situated on the first belt 1 is attracted by the magnetic device of the second belt 2 when the said reinforcing ply is brought into line with the magnetized region 23 of the said second belt 2.

In practice, the distance e is substantially equal to the thickness of the reinforcing plies to be transferred, increased by 0.5 mm to 1 mm. This distance may also be adjustable so that the transfer device can be adapted to suit the dimensional variety of the reinforcing plies.

The device depicted in FIGS. 1 to 4 makes provision for the magnetized region 13 of the first belt to be situated on the vertically upper part of the first belt and for the magnetized region 23 of the second belt 2 to be positioned on the vertically lower part of the second belt 2. It will be noted that this arrangement could be reversed without that altering the general principles of the invention.

The magnetized regions 13, 23 have a substantially trapezoidal shape. The bases of the trapeziums are parallel to the longitudinal direction of the transfer belts and correspond to the direction of motion of the reinforcing plies. By contrast, the sides joining the two bases situated in line with the region of overlap of the belts make an angle with the longitudinal direction, the angles being $a_1$ and $a_2$ respectively (see circled detail of FIG. 1).

The width of the magnetized region is preferably equal to or greater than the widths of the reinforcing plies being transferred. However, it is possible to obtain substantially equivalent results when the said width is slightly smaller than that of the reinforcing plies.

The magnitudes of the angles $a_1$ and $a_2$ are determined on the basis of the mean angle b formed by the threads of the reinforcing plies with the longitudinal direction. Steps will then be taken to ensure that the angle $a_1$ is smaller than the angle b and that the angle $a_2$ is larger than the angle b. In addition, the belts are arranged in the region of overlap in such a way that the magnetized regions 13 and 23 do not overlap. This results in the creation of a region 3 in which the magnetic fluxes of the first belt and of the second belt have no effect on the metallic elements contained in the reinforcing plies.

In practice, there are two families of ply commonly used in the tire-building industry. A first family of plies in which the angles vary between 18° ($b_{min}$) and 26° ($b_{max}$), and a second family of plies the angles of which vary between 50° ($b_{min}$) and 65° ($b_{max}$).

The value of $a_1$ is comprised in the range $b_{min}-5°$, $b_{min}$, and the value of the angle $a_2$ is comprised in the range $b_{max}$, $b_{max}+5°$, so that the region 3 is of sufficiently large surface area to allow the separation of the magnetic fluxes, but without being too great because it is necessary to reduce as far as possible the area in which the reinforcing plies are not held firmly against the surface of one of the belts. What this means is that the value of $a_1$ is comprised between 13° and 18° in the case of the first family of plies and between 45° and 50° in the case of the second family of plies, and that the value of $a_2$ is comprised between 26° and 31° in the case of the first family of plies and between 65° and 70° in the case of the second family of plies.

When a reinforcing ply 41 is being transferred from the first belt 1 to the second belt 2, the reinforcing ply 41, or first reinforcing ply, is positioned on the first belt 1 at the start of a succession of identical reinforcing plies in which the selvedge of the rear part of one reinforcing ply is in contact with the selvedge of the front part of the next reinforcing ply and in a first step, steps are taken to ensure that the two belts advance at the same speed.

The first reinforcing ply 41 is transferred from the first belt to the second belt by successively crossing the region 13 which keeps the reinforcing ply in contact with the conveyor belt of the first belt, then the region 3 in which there is no magnetic flux applied to the threads of the first reinforcing ply, as far as the region 23 in which the reinforcing ply is attracted to and held firmly on the surface of the conveyor belt of the second belt 2 by the magnetic devices in the region 23.

The second reinforcing ply 42 advances, remaining held in position by the magnetized region 13 of the first belt 1.

The motion of the first belt 1 is halted when the rear selvedge of the first reinforcing ply 41 and the front selvedge of the second reinforcing ply 42 immediately following it come into line with the non-magnetized region 3.

Figure 2:
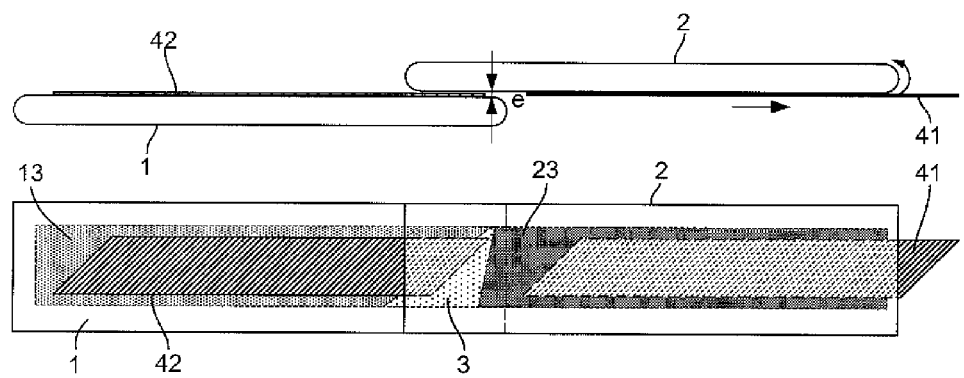
FIG. 2 depicts a schematic view in section and view from above of a device according to the invention during the step of discharging the first reinforcing ply.

Finally, the transfer of the first reinforcing ply 41 is continued by the second belt 2 until it has been completely discharged from the first belt, as illustrated in FIG. 2. The front part of the second reinforcing ply 42 remains in contact with the first belt 1 and the rear part of the first reinforcing ply 41 is brought into contact with the second belt 2.

The choice of the length l of the region of overlap of the two belts is dependent on the value of the angle b of the threads of reinforcing plies with the longitudinal direction and on the width of the reinforcing plies being transferred. The wider the angle b, the shorter can be the length of overlap l, and vice versa. Steps will therefore be taken to ensure that the region of overlap of the belts covers substantially all of the non-magnetized region 3.

Figure 3:
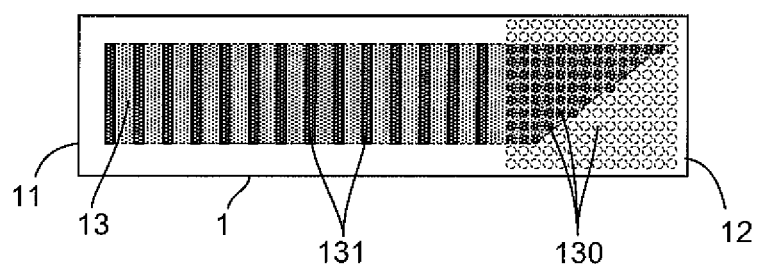
FIGS. 3 and 4 depict schematic views from above of one particular embodiment of the invention.
Figure 4:
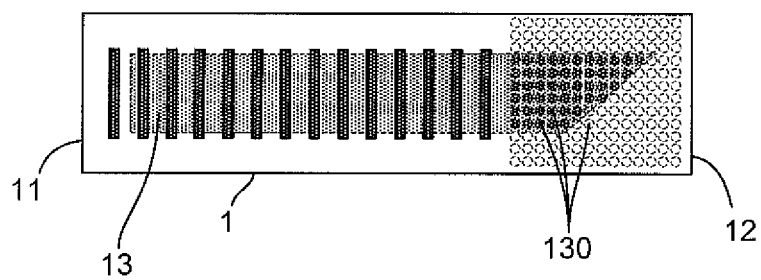

FIGS. 3 and 4 illustrate one particular embodiment of the invention in which the magnetized regions 13 and 23 respectively of each of the belts 1 and 2 respectively, which are situated in the respective parts of the belts intended to overlap, consist of a set of electromagnets 130 positioned under the surface of the conveyor belt in a matrix configuration.

This particular arrangement makes it possible to alter the shape of the trapezium 13, 23 respectively in the region of overlap of the belts, when the value of the angle b varies greatly from one size of reinforcing strip to another. By suitably activating certain electromagnets it is possible substantially to modify the value of the angles $a_1$ and $a_2$ respectively and to adapt the transfer device to suit the angle b of the reinforcing plies being transferred.

The smaller the size of the electromagnets positioned in this region of the trapezium the more possible it will be to situate a great many electromagnets under the surface of the conveyor belt, and the more precise will be the definition of the magnetic boundary of the trapezium 13, 23 respectively in the region of overlap of the belts.

The invention claimed is:

1. A transfer device intended for transferring a reinforcing ply having the overall shape of a non-rectangular parallelogram and containing reinforcing threads with ferromagnetic properties making a given acute angle with the longitudinal direction of the said reinforcing ply, comprising at least two transfer belts which overlap over a given length 1 and are separated by a given and small-sized distance e, each of the belts comprising a magnetized region of trapezoidal shape, the bases of which are parallel to the longitudinal direction of the belts and are intended to hold the reinforcing ply firmly against the moving surface of the said transfer belts, wherein, in the region of overlap of the belts, the side of the trapezium connecting the two bases of the magnetized region of the second belt forms an angle $a_2$ with the longitudinal direction which is smaller than or equal to 90°, and the side of the trapezium connecting the two bases of the magnetized region of the first belt forms an angle $a_1$ with the longitudinal direction which is smaller than the angle $a_2$, and wherein the magnetized regions of the two belts do not overlap, so as to form a non-magnetized region positioned in line with the region of overlap of the transfer belts.

2. The transfer device according to claim 1, wherein the value of $a_1$ is comprised between 13° and 18° and the value of $a_2$ is comprised between 26° and 31°.

3. The transfer device according to claim 1, wherein the value of $a_1$ is comprised between 45° and 50° and the value of $a_2$ is comprised between 65° and 70°.

4. The transfer device according to claim 1, wherein the magnetized regions are formed by permanent magnets situated in close proximity to the moving part of the transfer belt in contact with the reinforcing ply.

5. The transfer device according to claim 1, wherein the magnetized regions are formed by electromagnets situated in close proximity to the moving part of the transfer belt in contact with the reinforcing ply.

6. The transfer device according to claim 5, wherein the magnetized region of each of the transfer belts and positioned in the region of overlap of the belts, is formed by a plurality of electromagnets arranged in a matrix configuration and which can be activated in such a way as to modify the angle formed by the side of the trapezium connecting the two bases of the magnetized region situated in this region.

7. A method for transferring, using a transfer device according to claim 1, from the first belt to the second belt, a reinforcing ply having the overall shape of a parallelogram and containing reinforcing threads with ferromagnetic properties and making a given angle b smaller than 90° with the longitudinal direction of the reinforcing ply, wherein the values of the angles $a_1$ and $a_2$ are determined in such a way that the angle $a_2$ is larger than or equal to the angle b and in such a way that the angle $a_1$ is smaller than the angle b.

8. The method according to claim 7, wherein the reinforcing ply is placed on the first belt at the start of a succession of identical reinforcing plies in which the selvedge of the rear part of one reinforcing ply is in contact with the selvedge of the front part of the next reinforcing ply, comprising:
   setting the two belts in motion at identical translational speeds so as to cause the first reinforcing ply to be transferred from the first belt onto the second belt;
   halting the motion of the first belt when the rear selvedge of the first reinforcing ply and the front selvedge of the second reinforcing ply following it come into line with the non-magnetized region ; and
   continuing transfer of the first reinforcing ply onto the second belt until it has completely left the first belt.

* * * * *